(12) United States Patent
Xiong et al.

(10) Patent No.: US 11,844,073 B2
(45) Date of Patent: Dec. 12, 2023

(54) PHYSICAL UPLINK CONTROL CHANNEL PROCEDURES

(71) Applicant: APPLE INC., Cupertino, CA (US)

(72) Inventors: Gang Xiong, Portland, OR (US); Glenn J. Bradford, Hillsboro, OR (US); Ajit Nimbalker, Fremont, CA (US); Joonyoung Cho, Portland, OR (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 777 days.

(21) Appl. No.: 16/071,839

(22) PCT Filed: Jun. 29, 2016

(86) PCT No.: PCT/US2016/040111
§ 371 (c)(1),
(2) Date: Jul. 20, 2018

(87) PCT Pub. No.: WO2017/146762
PCT Pub. Date: Aug. 31, 2017

(65) Prior Publication Data
US 2021/0212054 A1    Jul. 8, 2021

Related U.S. Application Data

(60) Provisional application No. 62/300,628, filed on Feb. 26, 2016.

(51) Int. Cl.
*H04W 72/21* (2023.01)
*H04L 5/00* (2006.01)

(52) U.S. Cl.
CPC ........... *H04W 72/21* (2023.01); *H04L 5/0055* (2013.01)

(58) Field of Classification Search
CPC .............. H04W 72/0413; H04W 72/21; H04L 5/0055; H04L 5/1469; H04L 5/0053; H04M 1/72519; H04M 1/72522
(Continued)

(56) References Cited

U.S. PATENT DOCUMENTS 10,306,612 B2 *   5/2019   Choi ..................... H04L 5/0053
10,841,066 B2 *  11/2020   Takeda ..................... H04J 11/00
(Continued)

FOREIGN PATENT DOCUMENTS

CN    107113121 A  *  8/2017   ........... H04B 7/0626
CN    107925532 A  *  4/2018   ........... H04L 1/0026
(Continued)

OTHER PUBLICATIONS

International Preliminary Report on Patentability received for International Application No. PCT/US2016/040111, dated Sep. 7, 2018, 9 pages.
(Continued)

*Primary Examiner* — Mahendra R Patel
(74) *Attorney, Agent, or Firm* — Fay Kaplun & Marcin, LLP (57) ABSTRACT

Techniques related to physical uplink control channel procedures are described. Briefly, in accordance with one embodiment, an Uplink Control Information (UCI) payload size is determined based at least in part on configuration information and Downlink Control Information (DCI). A Fifth Generation (5G) Physical Uplink Control Channel (xPUCCH) format is then determined based at least in part on the determined UCI payload size. Other embodiments are also disclosed and claimed.

19 Claims, 6 Drawing Sheets

(58) Field of Classification Search
USPC .................. 370/329, 310.2; 455/452.1, 418
See application file for complete search history.

(56) References Cited

U.S. PATENT DOCUMENTS

| | | | | |
|---|---|---|---|---|
| 2010/0279628 | A1* | 11/2010 | Love | H04L 5/0091 |
| | | | | 455/70 |
| 2011/0110315 | A1* | 5/2011 | Chen | H04L 5/0053 |
| | | | | 370/329 |
| 2013/0343327 | A1* | 12/2013 | Jang | H04L 5/0044 |
| | | | | 370/329 |
| 2014/0192738 | A1* | 7/2014 | Nam | H04W 52/346 |
| | | | | 370/329 |
| 2015/0135154 | A1* | 5/2015 | Fung | G06F 30/394 |
| | | | | 716/113 |
| 2015/0358924 | A1* | 12/2015 | Papasakellariou | |
| | | | | H04W 72/0406 |
| | | | | 370/329 |
| 2016/0182187 | A1* | 6/2016 | Kim | H04L 1/0068 |
| | | | | 714/807 |
| 2016/0295574 | A1* | 10/2016 | Papasakellariou | H04L 1/0073 |
| 2017/0070277 | A1* | 3/2017 | Si | H04B 7/0456 |
| 2017/0135084 | A1* | 5/2017 | Kuchibhotla | H04W 72/0446 |
| 2017/0163388 | A1* | 6/2017 | Wiemann | H04W 72/0413 |
| 2018/0041992 | A1* | 2/2018 | Bin Sediq | H04W 72/042 |
| 2018/0242286 | A1* | 8/2018 | Song | H04L 1/0072 |
| 2018/0323907 | A1* | 11/2018 | Takeda | H04L 5/001 |

FOREIGN PATENT DOCUMENTS

| | | | | |
|---|---|---|---|---|
| EP | 2613602 A2 * | 7/2013 | | H04L 1/0023 |
| EP | 2613602 A2 | 7/2013 | | |
| EP | 2639986 A2 * | 9/2013 | | H04L 1/0026 |
| EP | 2690807 A2 * | 1/2014 | | G06F 3/03547 |
| EP | 2849519 A1 | 3/2015 | | |
| EP | 2849519 A1 * | 3/2015 | | H04B 7/2656 |
| WO | WO-2009047413 A1 * | 4/2009 | | H04L 12/2872 |
| WO | WO-2012121546 A2 * | 9/2012 | | H04B 7/0632 |
| WO | 2014/133320 A1 | 9/2014 | | |
| WO | WO-2014133320 A1 * | 9/2014 | | H04L 1/0025 |
| WO | 2015/019852 A1 | 2/2015 | | |
| WO | WO-2015026148 A1 * | 2/2015 | | H03M 13/09 |
| WO | WO-2017030489 A1 * | 2/2017 | | H04L 1/0072 |
| WO | 2017/146762 A1 | 8/2017 | | |

OTHER PUBLICATIONS

International Search Report and Written Opinion received for International Application No. PCT/US2016/040111, dated Nov. 8, 2016, 13 pages.

* cited by examiner

PHYSICAL UPLINK CONTROL CHANNEL PROCEDURES

CROSS-REFERENCE TO RELATED APPLICATIONS

This application claims priority under 35 U.S.C. § 371 to International Application No. PCT/US2016/040111 filed Jun. 29, 2016, entitled PHYSICAL UPLINK CONTROL CHANNEL PROCEDURES, which in turn is related to and claims priority to U.S. Provisional Patent Application No. 62/300,628, entitled "Physical Uplink Control Channel Procedures" filed Feb. 26, 2016, which are hereby incorporated herein by reference for all purposes and in their entirety.

FIELD

The present disclosure generally relates to the field of electronic communication. More particularly, some embodiments generally relate to physical uplink control channel procedures.

BACKGROUND

Mobile communication has evolved significantly from early voice systems to today's highly sophisticated integrated communication platforms. 4G (4th Generation) LTE (Long Term Evolution) networks are deployed in more than 100 countries to provide services in various spectrum band allocations, depending on spectrum regime. Recently, significant momentum has started to build around the idea of a next generation, or Fifth Generation (5G), wireless communications technology.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 6 is a schematic, block diagram illustration of components of a wireless device in accordance with one or more exemplary embodiments disclosed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

One or more embodiments relate to physical uplink control channel procedures (e.g., for 5G (Fifth Generation) and/or RAN1 (Radio layer 1 3GPP (Third Generation Partnership Project) LTE (Long Term Evolution)). More particularly, in some embodiments, 5G physical uplink control channel (xPUCCH) procedures discussed herein provide: (1) xPUCCH formats with supported Uplink Control Information (UCI) and resource allocation; and/or (2) collision handling in the case where 5G physical uplink shared channel (xPUSCH) and xPUCCH are scheduled in the same subframe for one UE.

Figure 1:
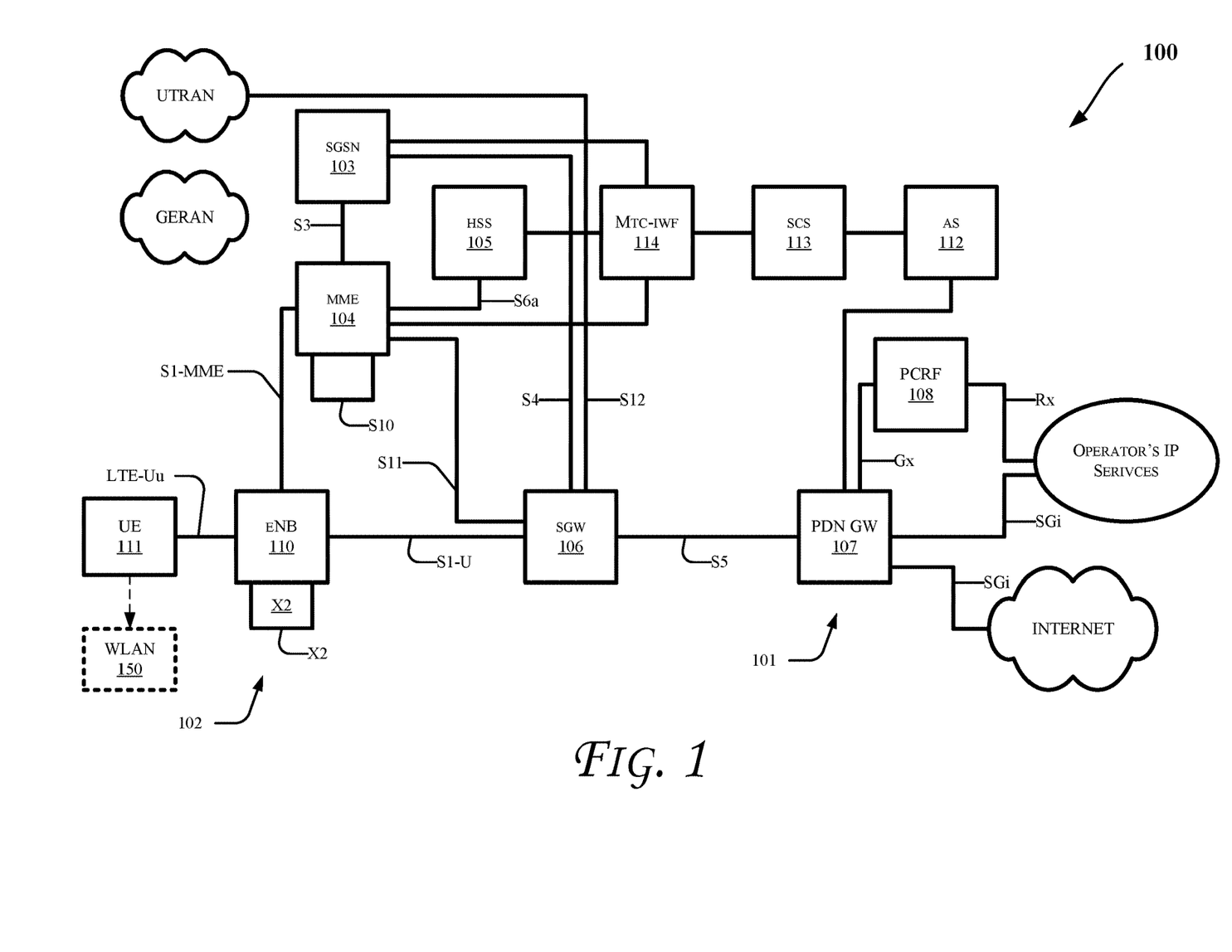
FIG. 1 shows an exemplary block diagram of the overall architecture of a 3GPP LTE network that includes one or more devices that are capable of implementing techniques for physical uplink control channel procedures, according to the subject matter disclosed herein.

FIG. 1 shows an exemplary block diagram of the overall architecture of a 3GPP LTE network 100 that includes one or more devices that are capable of implementing techniques for physical uplink control channel procedures, according to the subject matter disclosed herein. FIG. 1 also generally shows exemplary network elements and exemplary standardized interfaces. At a high level, network 100 comprises a Core Network (CN) 101 (also referred to as an Evolved Packet System (EPC)), and an air-interface access network E-UTRAN (Evolved Universal Terrestrial Radio Access Network) 102. CN 101 is responsible for the overall control of the various User Equipment (UE) coupled to the network and establishment of the bearers. CN 101 may include functional entities, such as a home agent and/or an ANDSF (Access Network Discovery and Selection Function) server or entity, although not explicitly depicted. E-UTRAN 102 is responsible for all radio-related functions.

Exemplary logical nodes of CN 101 include, but are not limited to, a Serving GPRS Support Node (SGSN) 103, Mobility Management Entity (MME) 104, a Home Subscriber Server (HSS) 105, a Serving Gateway (SGW) 106, a PDN Gateway (or PDN GW) 107, and a Policy and Charging Rules Function (PCRF) Manager logic 108. The functionality of each of the network elements of CN 101 is generally in accordance with various standards and is not described herein for simplicity. Each of the network elements of CN 101 are interconnected by exemplary standardized interfaces, some of which are indicated in FIG. 1, such as interfaces S3, S4, S5, etc.

While CN 101 includes many logical nodes, the E-UTRAN access network 102 is formed by at least one node, such as evolved NodeB 110 (Base Station (BS), eNB (or eNodeB that refers to evolved Node B)), which couples to one or more UE 111, of which only one is depicted in FIG. 1 for the sake of simplicity. UE 111 is also referred to herein as a Wireless Device (WD) and/or a Subscriber Station (SS), and may include an M2M (Machine to Machine) type device. In one example, UE 111 may be coupled to eNB by an LTE-Uu interface. In one exemplary configuration, a single cell of an E-UTRAN access network 102 provides one substantially localized geographical transmission point (e.g., having multiple antenna devices) that provides access to one or more UEs. In another exemplary configuration, a single cell of an E-UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning.

For normal user traffic (as opposed to broadcast), there is no centralized controller in E-UTRAN; hence the E-UTRAN architecture is said to be flat. The eNBs can be interconnected with each other by an interface known as "X2" and to the EPC by an S1 interface. More specifically, an eNB is coupled to MME 104 by an S1 MME interface and to SGW 106 by an S1 U interface. The protocols that run between the eNBs and the UEs are generally referred to as the "AS protocols." Details of the various interfaces can be in accordance with available standards and are not described herein for the sake of simplicity.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS (Quality of Service), cell information broadcast, ciphering/deciphering of user and control plane data, and compression/decompression of DL/UL (Downlink/Uplink) user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers. Various types of (WLAN) may be supported such as any of those discussed herein.

As mentioned above in the background section, recently, significant momentum has started to build around the idea of a next generation, or Fifth Generation (5G), wireless communications technology. A wide range of applications and services may be used with 5G systems, such as: (a) Enhanced Mobile Broadband: providing higher data rates will continue to be a key driver in network development and evolution for 5G system (for example, it can be envisioned that a peak data rate of more than 10 Gps and a minimum guaranteed user data rate of at least 100 Mbps be supported for 5G system); (b) Massive Machine Type Communications (MTC): support of a massive number of Internet of Things (IoT) or MTC devices may become one key feature for 5G system (for example, where MTC devices used for many applications may utilize low operational power consumption and be expected to communicate with infrequent small burst transmissions); and/or (c) Ultra-reliable and low latency or mission critical communications: support of mission critical MTC applications for 5G system may provide extremely high level of reliable connectivity with guaranteed low latency, availability, and reliability-of-service.

As mentioned above, mobile communication has evolved significantly from early voice systems to today's highly sophisticated integrated communication platform. The next generation wireless communication system, 5G, aims to provide access to information and sharing of data anywhere, anytime by various users and applications. 5G is expected to be a unified network/system that target to meet vastly different and sometime conflicting performance dimensions and services. Such diverse multi-dimensional goals are driven by different services and applications. In general, 5G will evolve based on 3GPP LTE-Advanced with additional potential new Radio Access Technologies (RATs) to enrich people's lives with better, simpler, and more seamless wireless connectivity solutions. 5G aims to enable everything connected by wireless and deliver fast, rich content and services.

Figure 2:
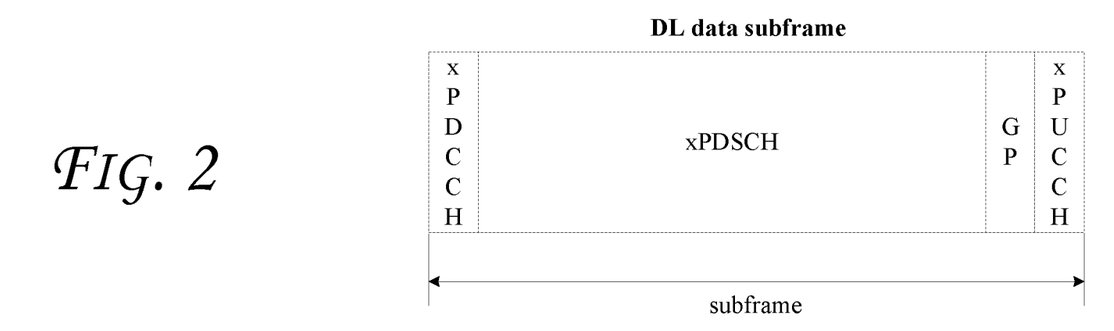
FIGS. 2-4 illustrates subframe structures in accordance with some embodiments.
Figure 3:
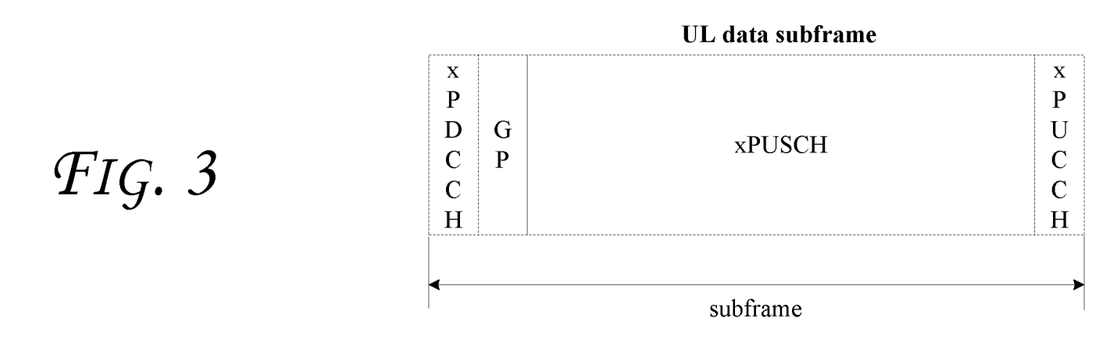
Figure 4:
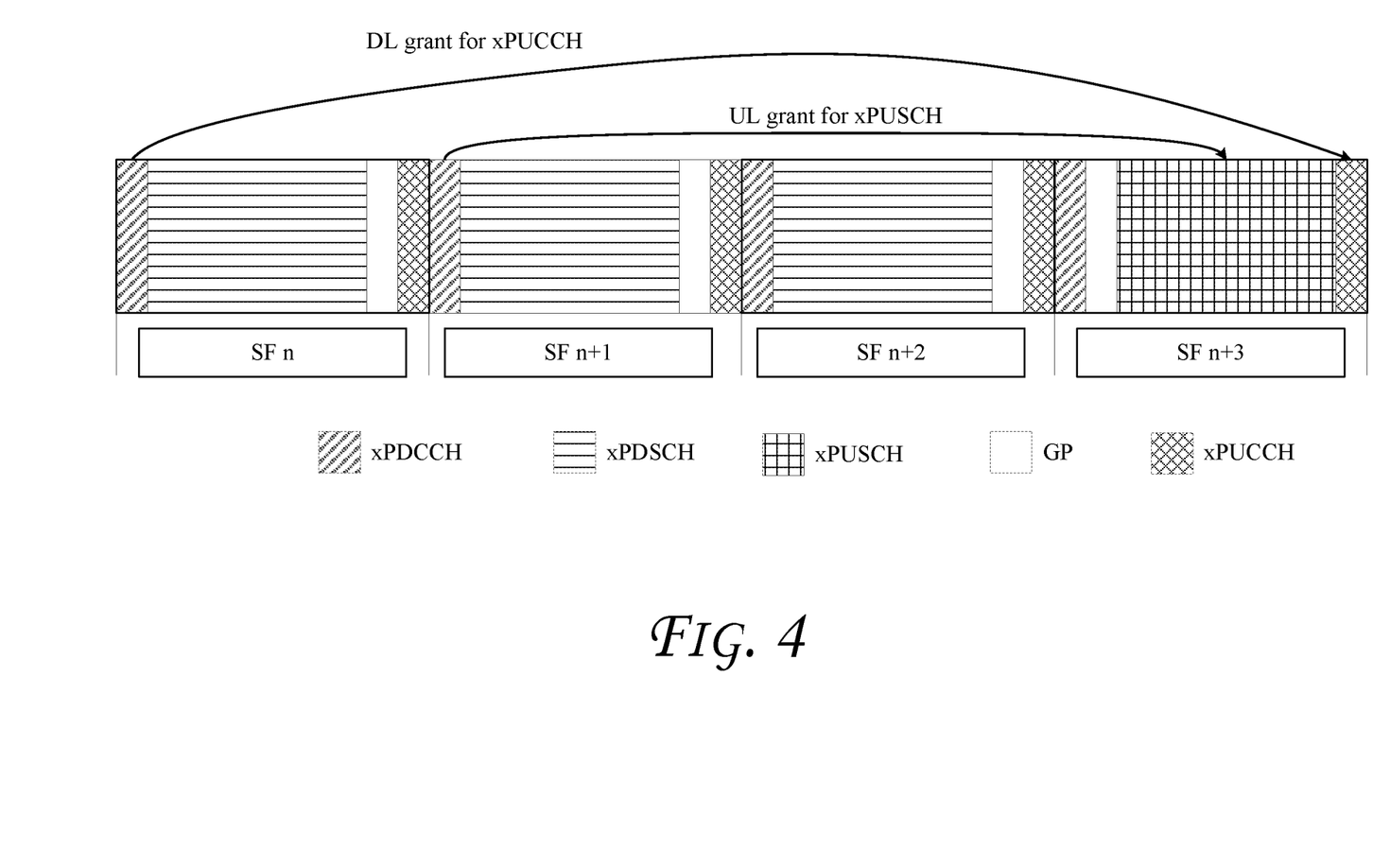

FIGS. 2-4 illustrates subframe structures in accordance with some embodiments. To enable low latency transmission for enhanced mobile broadband communication, self-contained TDD (Time Division Duplex) subframe structure can be introduced in 5G system. FIGS. 2 and 3 illustrate an example of self-contained TDD subframe structures including both downlink (DL) (FIG. 2) and uplink (UL) (FIG. 3) in one subframe. In order to accommodate the DL to UL and UL to DL switching time and round-trip propagation delay, a Guard Period (GP) is inserted between 5G physical downlink shared channel (xPDSCH) and xPUCCH, as well as 5G physical downlink control channel (xPDCCH) and xPUSCH.

In the existing LTE specification, PUCCH is transmitted in a frequency region on the edges of the system bandwidth. Further, PUCCH and physical uplink shared channel (PUSCH) are multiplexed in a Frequency Division Multiplexing (FDM) manner. However, as depicted in the FIGS. 2 and 3, xPUCCH and data channel are multiplexed in a Time Division Multiplexing (TDM) manner.

Furthermore, UCI may include one or more: scheduling request (SR), Hybrid Automatic Repeat Request (HARQ) ACK/NACK (Acknowledge/Not Acknowledge) feedback, Channel State Information (CSI) report (e.g., Channel Quality Indicator (CQI)), Pre-coding Matrix Indicator (PMI), Rank Indicator (RI), and/or beam related information. Depending on different payload sizes, different xPUCCH formats may be defined.

xPUCCH Formats and Resource Allocation

As mentioned above, depending on UCI payload size, different xPUCCH formats can be defined. Table 1 illustrates the detailed xPUCCH formats and supported UCI in each xPUCCH format, in accordance with one or more embodiments.

TABLE 1

UCI information and xPUCCH formats

| xPUCCH format | Payload Size | Modulation | Number of bits | Supported UCI |
|---|---|---|---|---|
| 1 | N/A (Not Applicable) | N/A | N/A | SR |
| 1a | 1 bit | Binary Phase Shift Keying (BPSK) | 1 | ACK/NACK |
| 1b | 2 bits | Quadrature Phase Shift Keying (QPSK) | 2 | ACK/NACK |
| 2 | 3-13 bits | QPSK | 48 | ACK/NACK (3~13 bits)<br>1) CQI (10 bits)<br>2) CQI (10 bits) + ACK/NACK (<=2 bits)<br>3) CQI (10 bits) + SR + ACK/NACK (<=2 bits)<br>1) Beam related (11 bits)<br>2) Beam related + ACK/NACK (<=2 bits)<br>2) Beam related + SR + ACK/NACK (<=1 bits) |
| 3 | 14-22 bits | QPSK | 96 | ACK/NACK (14-22 bits)<br>1) 2-CQI (20 bits)<br>2) 2 CQIs + ACK/NACK (<=2 bits)<br>3) 1 CQI (10 bits) + ACK/NACK (<=12 bits)<br>4) 1 CQI + SR + ACK/NACK (<=11 bits)<br>5) 2 CQI + SR + ACK/NACK (<=1 bits)<br>1) 1 Beam related (11 bits) + ACK/NACK (<=11 bits)<br>2) 2 Beam related (22 bits)<br>3) 1 Beam related (11 bits) + SR+ ACK/NACK (<=10 bits)<br>1) 1 CQI (10) + Beam (11)<br>2) 1 CQI (10) + Beam (11) + ACK/NACK (1) |
| 4 | >22 bits | QPSK | 192 | CQI + Beam + ACK/NACK + SR |

As illustrated in Table 1, four xPUCCH formats are defined as follows in accordance with various embodiments:

xPUCCH format 1/1a/1b can be used to carry scheduling request and 1 or 2 bit HARQ ACK/NACK feedback, respectively.

xPUCCH format 2 can be used to carry scheduling request, HARQ ACK/NACK feedback for multiple HARQ processes, CSI report and/or beam related information. The payload size can be less than 14 bits and greater than 2 bits in an embodiment.

xPUCCH format 3 can be used to carry scheduling request, HARQ ACK/NACK feedback for multiple HARQ processes, CSI report and/or beam related information. The payload size can be less than or equal to 22 bits and greater than 13 bits or 3 bits in an embodiment.

xPUCCH format 4 can be used to carry scheduling request, HARQ ACK/NACK feedback for multiple HARQ processes, CSI report and/or beam related information. The payload size can be larger than 22 bits in an embodiment.

In order to determine the xPUCCH format, UE may first determine the UCI payload size based on the scheduling information in the Downlink Control Information (DCI) and configuration via RRC signaling. Subsequently, based on the determined UCI payload size, UE may determine the xPUCCH format for xPUCCH transmission.

In one example, eNB may trigger UE to respond (or feedback) with HARQ ACK/NACK for 8 HARQ processes, which results in 8 HARQ ACK/NACK bits in the case of single transport block per HARQ process. In this case, UCI payload size is 8 bits, which indicates that UE may use xPUCCH format 2 for UCI transmission.

In another example, UE may be configured with CSI report mode with single CQI report. In the case when eNB triggers UE to report with CSI feedback, UE will respond/feedback the CSI reporting with single CQI report, i.e. with payload size of 10 bits as shown in the Table 1. Additionally, in the DCI for downlink assignment, eNB may trigger UE to report the HARQ ACK/NACK for 4 HARQ processes, which results in 4 HARQ ACK/NACK bits. In this case, UCI payload size is 14 bits, which indicates that UE may use xPUCCH format 3 for UCI transmission.

To determine the xPUCCH resource for xPUCCH transmission, in one embodiment, N (e.g., N=4) xPUCCH resource values can be configured for each xPUCCH format by higher layers via RRC signaling. An xPUCCH resource allocation field in the DCI can be used to indicate one of N xPUCCH resource values.

Table 2 illustrates the mapping for the xPUCCH resource value for each xPUCCH format i∈{1/1a/1b,2,3,4} in accordance with some embodiments. In this case, UE may first determine the xPUCCH format based on the UCI payload size and then determine the xPUCCH resource from the resource allocation index in the DCI for downlink assignment.

TABLE 2 xPUCCH resource value mapping for each xPUCCH format

| Value of 'xPUCCH resource allocation index' | $n_{xPUCCH}^{(i)}$ |
|---|---|
| '00' | The first resource value for xPUCCH format i configured by the higher layers |
| '01' | The second resource value for xPUCCH format i configured by the higher layers |
| '10' | The third resource value for xPUCCH format i configured by the higher layers |
| '11' | The fourth resource value for xPUCCH format i configured by the higher layers |

In another embodiment, the same N (e.g., N=4) xPUCCH resource values can be configured for all xPUCCH formats by higher layers via RRC signaling. An xPUCCH resource allocation field in the DCI can be used to indicate one of N xPUCCH resource values. Table 3 illustrates the mapping for the xPUCCH resource value for all xPUCCH formats in accordance with some embodiments. This option may help to reduce the signaling overhead for xPUCCH resource value configuration. In this case, UE can determine the xPUCCH resource only from the resource allocation index in the DCI for downlink assignment.

TABLE 3

Same xPUCCH resource value mapping for xPUCCH format

| Value of 'xPUCCH resource allocation index' | $n_{xPUCCH}$ |
|---|---|
| '00' | The first xPUCCH resource value configured by the higher layers |
| '01' | The second xPUCCH resource value configured by the higher layers |
| '10' | The third xPUCCH resource value configured by the higher layers |
| '11' | The fourth xPUCCH resource value configured by the higher layers |

UCI Transmission on xPUCCH and xPUSCH

To carry large payloads and ensure a reasonable link budget, UCI may be carried in the xPUSCH. Given that xPUSCH is scheduled by a DCI with UL grant and xPUCCH is schedule by a DCI with DL grant, collision handling may need to be considered if xPUSCH and xPUCCH collide in the same subframe and both are used to carry UCI.

To this end, FIG. 4 illustrates one example of xPUCCH and xPUSCH for one UE in the same subframe, according to an embodiment. In this example, xPUCCH scheduled by xPDCCH with DL grant is transmitted in subframe n+3. Meanwhile, xPUSCH scheduled by xPDCCH with UL grant is also transmitted in subframe n+3.

In one embodiment, given that xPUSCH and xPUCCH are multiplexed in the Time Division Multiplexing (TDM) manner, UE may transmit the xPUSCH and xPUCCH in the same subframe. This may be more appropriate for the UE in the cell center with a reasonable link budget.

In another embodiment, in the case where xPUSCH and xPUCCH are scheduled in the same subframe for one UE, the xPUCCH UCI is dropped and UE may only transmit xPUSCH on the scheduled subframe. Given that reasonable link budget may be achieved by using xPUSCH to carry UCI, this scheme may be more appropriate for the cell edge UEs. In particular, when the UE successfully receives the xPUCCH grant but fails to receive the xPUSCH grant for the same subframe, it may still transmit UCI on xPUCCH. Upon failing to receiving the xPUSCH transmission, the eNB can attempt to receive this xPUCCH transmission to reduce resource usage inefficiency.

In another embodiment, a parameter (e.g., called "simultaneousPUSCHPUCCH") may be configured by higher layers to indicate whether xPUSCH and xPUCCH are allowed to be transmitted in the same subframe for one UE. In the case where this parameter is set to "TURE", xPUSCH and xPUCCH may be transmitted in the same subframe for one UE and vice versa. This parameter can be configured via 5G master information block (xMIB), 5G system information block (xSIB), and/or RRC signaling.

In another embodiment, UE may not expect that xPUSCH and xPUCCH are scheduled in the same subframe. In other words, eNB scheduler may ensure that xPUSCH and xPUCCH for the same UE are scheduled in the different subframes.

A sample detailed proposal is listed as follows:

11 Physical Uplink Control Channel Procedures 11.1 UE Procedure for Determining Physical Uplink Control Channel Assignment If the UE is configured by higher layers for xPUCCH transmission and receives a DCI scheduling xPUCCH transmission in subframe n, then uplink control information (UCI) may be transmitted using format 1/1a/1b, 2, 3, or 4. The configured xPUCCH resource for transmission of format i∈{1,1a/1b,2,3,4}, $n_{xPUCCH}^{(i)}$ may be indicated in the DCI from one of the four xPUCCH resource values configured by higher layers, with the mapping defined in Table 11.1-1.

TABLE 11.1-1 xPUCCH resource value mapping

| Value of 'xPUCCH resource allocation index' | $n_{xPUCCH}^{(i)}$ |
|---|---|
| '00' | The first resource value for xPUCCH format i configured by the higher layers |
| '01' | The second resource value for xPUCCH format i configured by the higher layers |
| '10' | The third resource value for xPUCCH format i configured by the higher layers |
| '11' | The fourth resource value for xPUCCH format i configured by the higher layers |

A UE is configured by higher layers to transmit xPUCCH on one antenna port ($p=p_0$) or two antenna ports ($p \in [p_0, p_1]$).

11.1.1 xPUCCH Format Information

Using the xPUCCH formats defined in subclause 5.4.1 and 5.4.2 in [3], the following combinations of UCI on xPUCCH are supported:

Format 1 for positive SR.
Format 1a for 1-bit HARQ-ACK
Format 1b for 2-bit HARQ-ACK
Format 2 for 3 to 13 bits of UCI including HARQ-ACK and/or CSI report and/or beam related information.
Format 3 for 13 to 22 bits of UCI including HARQ-ACK and/or CSI report and/or beam related information.
Format 4 for more than 22 bits of UCI including HARQ-ACK and/or CSI report and/or beam related information.

The scrambling initialization of xPUCCH format 2/3/4 is by C-RNTI.

11.1.3 Scheduling Request (SR) Procedure

A UE is configured by higher layers to transmit the SR on one antenna port or two antenna ports.

The xPUCCH resource for SR transmission, $n_{xPUCCH}^{(1)}$, may be indicated in the DCI from one of the four format 1 xPUCCH resource values configured by higher layers, with the mapping defined in Table 11.1-1.

Figure 5:
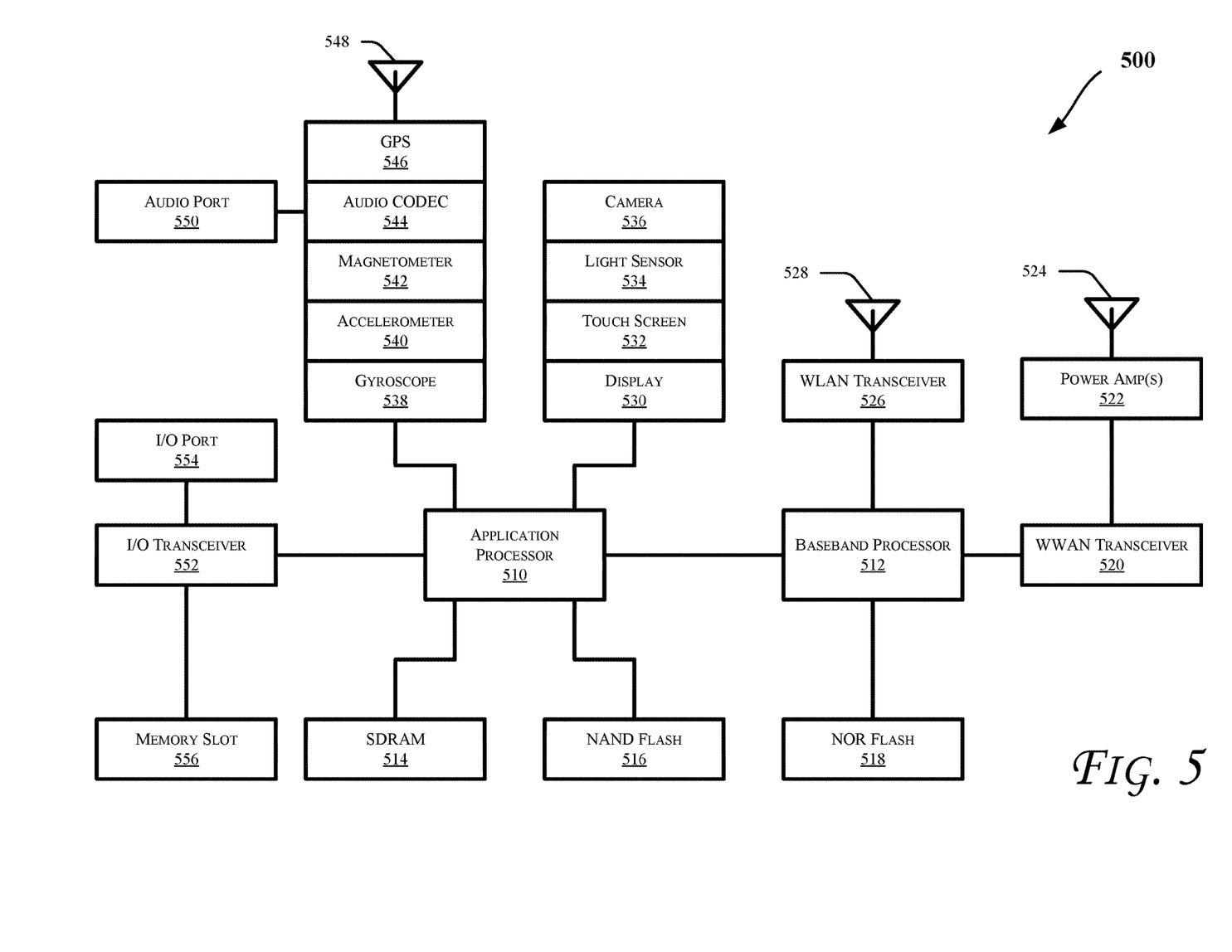
FIG. 5 is a schematic, block diagram illustration of an information-handling system in accordance with one or more exemplary embodiments disclosed herein.

Referring now to FIG. 5, a block diagram of an information handling system capable of user equipment controlled mobility in an evolved radio access network in accordance with one or more embodiments will be discussed. Information handling system 500 of FIG. 5 may tangibly embody any one or more of the network elements described herein, above, including for example the elements of network 100 with greater or fewer components depending on the hardware specifications of the particular device. In one embodiment, information handling system 500 may tangibly embody a user equipment (UE) comprising circuitry to enter into an evolved universal mobile telecommunications system (UMTS) terrestrial radio access (E-UTRAN) Routing Area Paging Channel (ERA_PCH) state, wherein the UE is configured with an E-UTRAN Routing Area (ERA) comprising a collection of cell identifiers, and an Anchor identifier (Anchor ID) to identify an anchor evolved Node B (eNB) for the UE, select to a new cell without performing a handover procedure, and perform a cell update procedure in response to the UE selecting to the new cell, although the scope of the claimed subject matter is not limited in this respect. In another embodiment, information handling system 500 may tangibly embody a user equipment (UE) comprising circuitry to enter into a Cell Update Connected (CU_CNCTD) state, wherein the UE is configured with an Anchor identifier (Anchor ID) to identify an anchor evolved Node B (eNB) for the UE, select to a new cell, perform a cell update procedure in response to the UE selecting to the new cell, perform a buffer request procedure in response to the UE selecting to the new cell, and perform a cell update procedure to download buffered data and to perform data transmission with the new cell, although the scope of the claimed subject matter is not limited in this respect. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an application processor 510 and a baseband processor 512. Application processor 510 may be utilized as a general-purpose processor to run applications and the various subsystems for information handling system 500. Application processor 510 may include a single core or alternatively may include multiple processing cores. One or more of the cores may comprise a digital signal processor or digital signal processing (DSP) core. Furthermore, application processor 510 may include a graphics processor or coprocessor disposed on the same chip, or alternatively a graphics processor coupled to application processor 510 may comprise a separate, discrete graphics chip. Application processor 510 may include on board memory such as cache memory, and further may be coupled to external memory devices such as synchronous dynamic random access memory (SDRAM) 514 for storing and/or executing applications during operation, and NAND flash 516 for storing applications and/or data even when information handling system 500 is powered off. In one or more embodiments, instructions to operate or configure the information handling system 500 and/or any of its components or subsystems to operate in a manner as described herein may be stored on an article of manufacture comprising a (e.g., non-transitory) storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 6 (3rd Generation Partnership Project Release 12), 3GPP Rel. 7 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/ PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mmWave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 542 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 510 and baseband processor 512, and the scope of the claimed subject matter is not limited in these respects. For example, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, application processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by application processor 510 and/or at least temporarily stored in NAND flash 516. Furthermore, application processor may couple to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 546 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, application processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Figure 6:
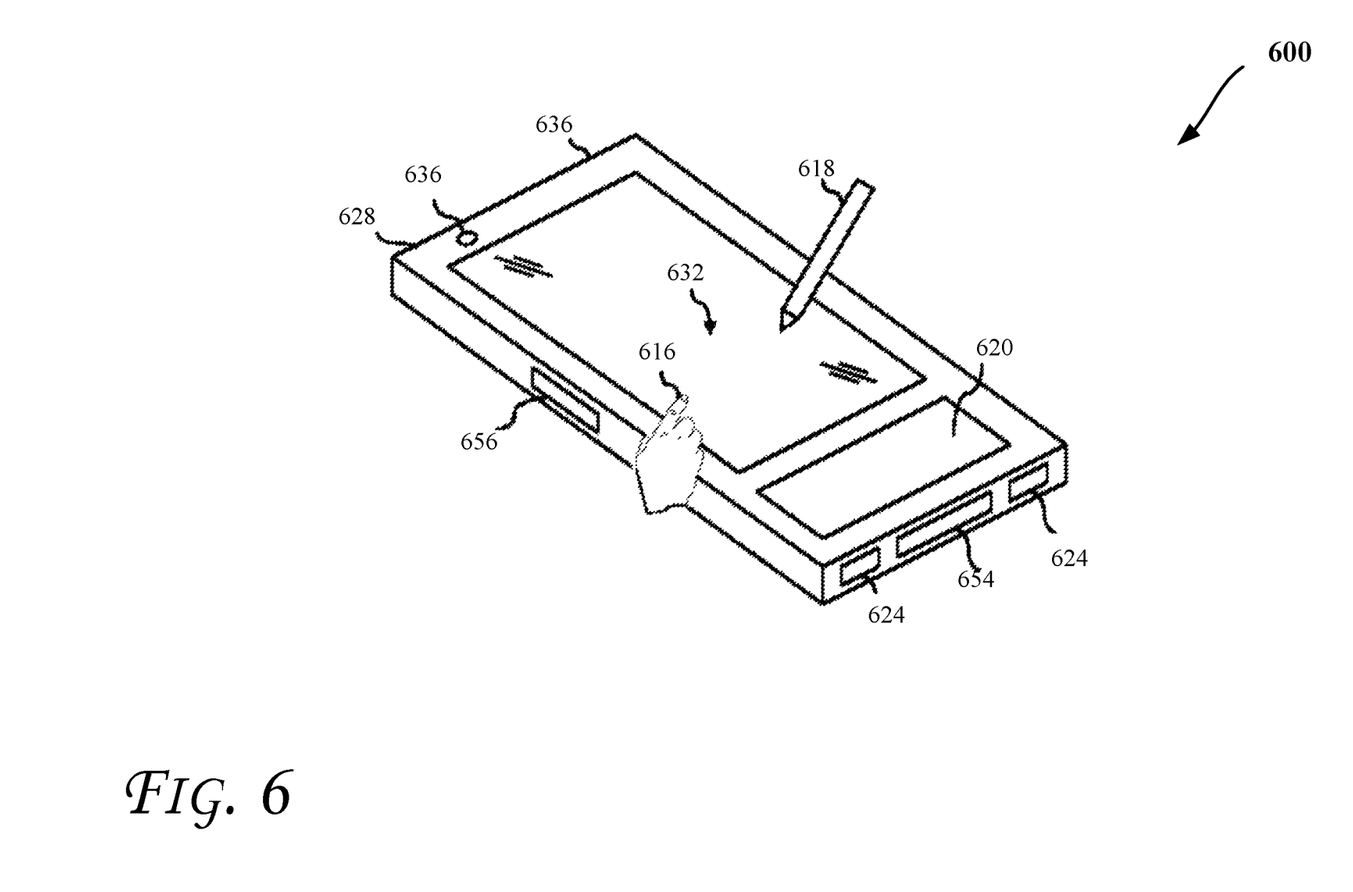
FIG. 6 is an isometric view of an exemplary embodiment of the information-handling system of FIG. 6 that optionally may include a touch screen in accordance with one or more embodiments disclosed herein.

Referring now to FIG. 6, an isometric view of an information handling system of FIG. 5 that optionally may include a touch screen in accordance with one or more embodiments will be discussed. FIG. 6 shows an example implementation of information handling system 500 of FIG. 5 tangibly embodied as a cellular telephone, smartphone, or tablet type device or the like. The information handling system 500 may comprise a housing 610 having a display 530 which may include a touch screen 532 for receiving tactile input control and commands via a finger 616 of a user and/or a via stylus 618 to control one or more application processors 510. The housing 610 may house one or more components of information handling system 500, for example one or more application processors 510, one or more of SDRAM 514, NAND flash 516, NOR flash 518, baseband processor 512, and/or WWAN transceiver 520. The information handling system 500 further may optionally include a physical actuator area 620 which may comprise a keyboard or buttons for controlling information handling system via one or more buttons or switches. The information handling system 500 may also include a memory port or slot 556 for receiving non-volatile memory such as flash memory, for example in the form of a secure digital (SD) card or a subscriber identity module (SIM) card. Optionally, the information handling system 500 may further include one or more speakers and/or microphones 624 and a connection port 554 for connecting the information handling system 500 to another electronic device, dock, display, battery charger, and so on. In addition, information handling system 500 may include a headphone or speaker jack 628 and one or more cameras 536 on one or more sides of the housing 610. It should be noted that the information handling system 500 of FIG. 6 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 7:
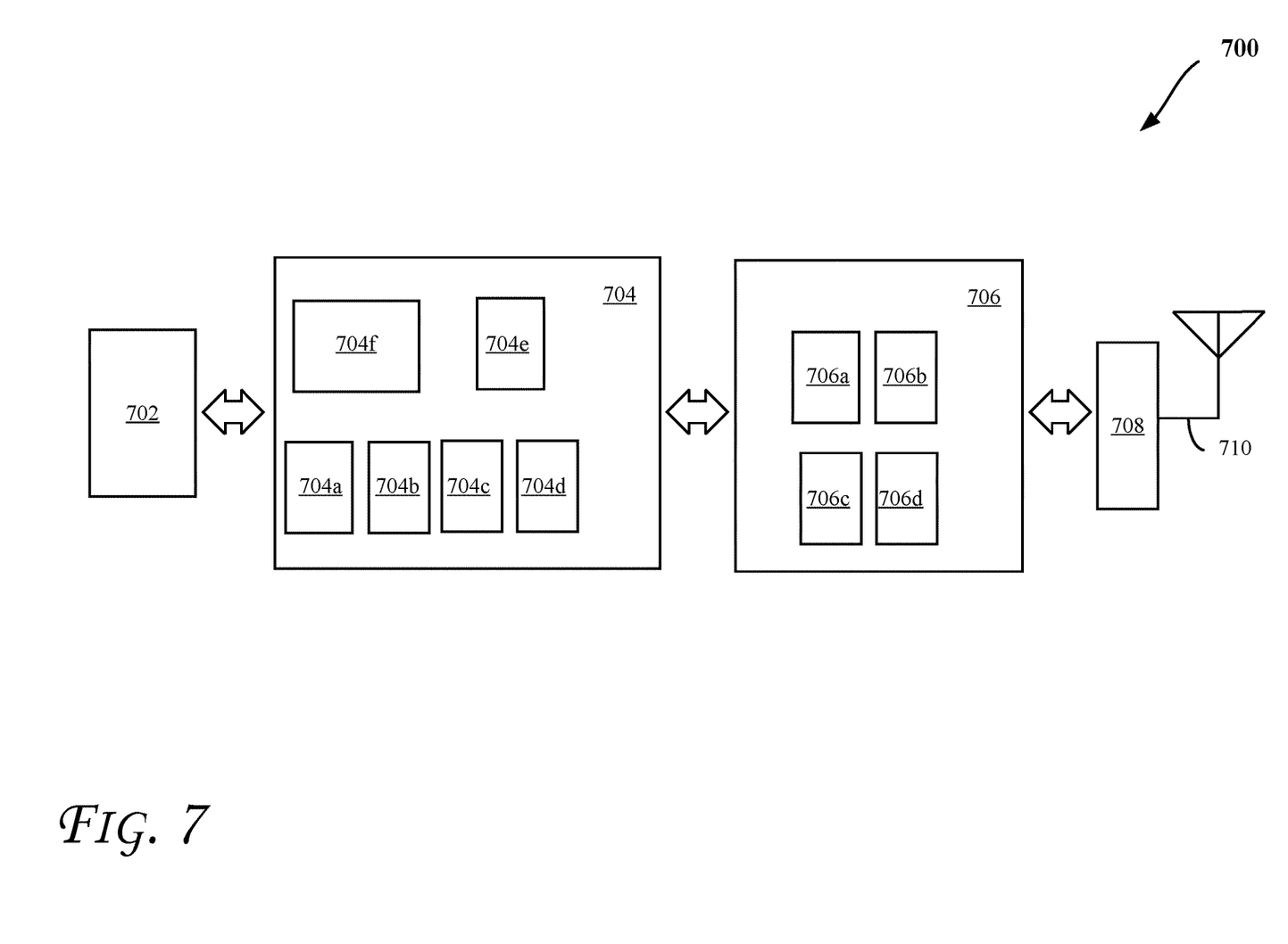
FIG. 7 shows components of a wireless device such as User Equipment (UE) device.

Referring now to FIG. 7, example components of a wireless device such as User Equipment (UE) device 110 in accordance with one or more embodiments will be discussed. In accordance with one embodiment, an eNB can include one or more components illustrated in and/or discussed with reference to FIG. 7. User equipment (UE) may correspond, for example, to UE 110 of network 100, although the scope of the claimed subject matter is not limited in this respect. In some embodiments, UE device 700 may include application circuitry 702, baseband circuitry 704, Radio Frequency (RF) circuitry 706, front-end module (FEM) circuitry 708 and one or more antennas 710, coupled together at least as shown.

Application circuitry 702 may include one or more application processors. For example, application circuitry 702 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 704 may include circuitry such as, but not limited to, one or more single-core or multi-core processors. Baseband circuitry 704 may include one or more baseband processors and/or control logic to process baseband signals received from a receive signal path of RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 504 may include a second generation (2G) baseband processor 704a, third generation (3G) baseband processor 704b, fourth generation (4G) baseband processor 704c, and/or one or more other baseband processors 704d for other existing generations, generations in development or to be developed in the future, for example fifth generation (5G), sixth generation (6G), and so on. Baseband circuitry 704, for example one or more of baseband processors 704a through 704d, may handle various radio control functions that enable communication with one or more radio networks via RF circuitry 706. The radio control functions may include, but are not limited to, signal modulation and/or demodulation, encoding and/or decoding, radio frequency shifting, and so on. In some embodiments, modulation and/or demodulation circuitry of baseband circuitry 704 may include Fast-Fourier Transform (FFT), precoding, and/or constellation mapping and/or demapping functionality. In some embodiments, encoding and/or decoding circuitry of baseband circuitry 504 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or Radio Resource Control (RRC) elements. Processor 704e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 704f. The one or more audio DSPs 704f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 704 and application circuitry 702 may be implemented together such as, for example, on a system on a chip (SOC).

In some embodiments, baseband circuitry 704 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 504 is configured to support radio communications of more than one wireless protocol may be referred to as multi-mode baseband circuitry.

RF circuitry 706 may enable communication with wireless networks using modulated electromagnetic radiation through a non-solid medium. In various embodiments, RF circuitry 706 may include switches, filters, amplifiers, and so on, to facilitate the communication with the wireless network. RF circuitry 706 may include a receive signal path which may include circuitry to down-convert RF signals received from FEM circuitry 708 and provide baseband signals to baseband circuitry 704. RF circuitry 706 may also include a transmit signal path which may include circuitry to up-convert baseband signals provided by the baseband circuitry 704 and provide RF output signals to FEM circuitry 708 for transmission.

In some embodiments, RF circuitry 706 may include a receive signal path and a transmit signal path. The receive signal path of RF circuitry 706 may include mixer circuitry 706a, amplifier circuitry 706b and filter circuitry 706c. The transmit signal path of RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from FEM circuitry 708 based on the synthesized frequency provided by synthesizer circuitry 706d. Amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, mixer circuitry 706a of the transmit signal path may be configured to up-convert input baseband signals based on the synthesized frequency provided by synthesizer circuitry 706d to generate RF output signals for FEM circuitry 708. The baseband signals may be provided by the baseband circuitry 704 and may be filtered by filter circuitry 706c. Filter circuitry 706c may include a low-pass filter (LPF), although the scope of the embodiments is not limited in this respect.

In some embodiments, mixer circuitry 706a of the receive signal path and the mixer circuitry 706a of the transmit signal path may include two or more mixers and may be arranged for quadrature down conversion and/or up conversion respectively. In some embodiments, mixer circuitry 706a of the receive signal path and the mixer circuitry 706a of the transmit signal path may include two or more mixers and may be arranged for image rejection, for example Hartley image rejection. In some embodiments, mixer circuitry 506a of the receive signal path and the mixer circuitry 706a may be arranged for direct down conversion and/or direct up conversion, respectively. In some embodiments, mixer circuitry 706a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 706 may include analog-to-digital converter (ADC) and digital-to-analog converter (DAC) circuitry, and baseband circuitry 504 may include a digital baseband interface to communicate with RF circuitry 706. In some dual-mode embodiments, separate radio integrated circuit (IC) circuitry may be provided for processing signals for one or more spectra, although the scope of the embodiments is not limited in this respect.

In some embodiments, synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

Synthesizer circuitry 706d may be configured to synthesize an output frequency for use by mixer circuitry 706a of RF circuitry 706 based on a frequency input and a divider control input. In some embodiments, synthesizer circuitry 706d may be a fractional N/N+1 synthesizer.

In some embodiments, frequency input may be provided by a voltage controlled oscillator (VCO), although that is not a requirement. Divider control input may be provided by either baseband circuitry 704 or applications processor 702 depending on the desired output frequency. In some embodiments, a divider control input (e.g., N) may be determined from a look-up table based on a channel indicated by applications processor 702.

Synthesizer circuitry 706d of RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 706 may include an in-phase and quadrature (IQ) and/or polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by RF circuitry 706 for transmission by one or more of the one or more antennas 710.

In some embodiments, FEM circuitry 708 may include a transmit/receive (TX/RX) switch to switch between transmit mode and receive mode operation. FEM circuitry 708 may include a receive signal path and a transmit signal path. The receive signal path of FEM circuitry 708 may include a low-noise amplifier (LNA) to amplify received RF signals and to provide the amplified received RF signals as an output, for example to RF circuitry 706. The transmit signal path of FEM circuitry 708 may include a power amplifier (PA) to amplify input RF signals, for example provided by RF circuitry 706, and one or more filters to generate RF signals for subsequent transmission, for example by one or more of antennas 710. In some embodiments, UE device 700 may include additional elements such as, for example, memory and/or storage, display, camera, sensor, and/or input/output (I/O) interface, although the scope of the claimed subject matter is not limited in this respect.

The following examples pertain to further embodiments. Example 1 includes an apparatus of a User Equipment (UE) capable to allow for physical uplink control channel procedures, the apparatus of the UE comprising baseband circuitry, including one or more processors, to: determine an Uplink Control Information (UCI) payload size based at least in part on configuration information and Downlink Control Information (DCI); determine a Fifth Generation (5G) Physical Uplink Control Channel (xPUCCH) format based at least in part on the determined UCI payload size; and encode xPUCCH data in accordance with the determined xPUCCH format. Example 2 includes the apparatus of example 1 or any other example discussed herein, wherein the one or more processors of the baseband circuitry is to generate the xPUCCH format for an allocated resource, wherein the allocated resource is to be indicated in the DCI. Example 3 includes the apparatus of any one of examples 1-2 or any other example discussed herein, wherein the configuration information is to comprise information to be configured via Radio Resource Control (RRC) signaling. Example 4 includes the apparatus of any one of examples 1-3 or any other example discussed herein, wherein the DCI is to comprise scheduling information. Example 5 includes the apparatus of any one of examples 1-4 or any other example discussed herein, wherein one or more xPUCCH resource values are to be configured for each xPUCCH format by higher layers via RRC signaling, wherein an xPUCCH resource allocation field in the DCI is to indicate one of the one or more xPUCCH resource values. Example 6 includes the apparatus of any one of examples 1-5 or any other example discussed herein, wherein the one or more processors of the baseband circuitry is to determine an xPUCCH resource from a resource allocation index in the DCI based at least in part on the determined xPUCCH format. Example 7 includes the apparatus of any one of examples 1-6 or any other example discussed herein, wherein one or more xPUCCH resource values are to be configured for all xPUCCH formats by higher layers via RRC signaling, wherein an xPUCCH resource allocation field in the DCI is to indicate one of the one or more xPUCCH resource values. Example 8 includes the apparatus of any one of examples 1-7 or any other example discussed herein, wherein the one or more processors of the baseband circuitry is to encode 5G Physical Uplink Shared Channel (xPUSCH) data and the xPUCCH data in a same subframe in response to a determination that xPUSCH and xPUCCH are scheduled in the same subframe for one UE. Example 9 includes the apparatus of any one of examples 1-8 or any other example discussed herein, wherein the one or more processors of the baseband circuitry is to drop xPUCCH and is to only encode xPUSCH data for a scheduled subframe in response to a determination that xPUSCH and xPUCCH are scheduled in a same subframe for one UE. Example 10 includes the apparatus of any one of examples 1-9 or any other example discussed herein, wherein a parameter is to be configured by higher layers, wherein a state of the parameter is to indicate whether the baseband processing circuitry is to encode both xPUSCH data and the xPUCCH data in a same subframe for one UE. Example 11 includes the apparatus of any one of examples 1-10 or any other example discussed herein, wherein the parameter is to be configurable via one or more of: a 5G Master Information Block (xMIB), a 5G System Information Block (xSIB), and RRC signaling. Example 12 includes the apparatus of any one of examples 1-11 or any other example discussed herein, wherein the one or more processors of the baseband circuitry shall receive xPUSCH and xPUCCH in the different subframes. Example 13 includes the apparatus of any of examples 1-12 or any other example discussed herein, further comprising transmission circuitry is to transmit data over the xPUCCH based on the determined xPUCCH format. Example 14 includes the apparatus of any of examples 1-13 or any other example discussed herein, UCI is to comprise one or more: a Scheduling Request (SR), a Hybrid Automatic Repeat Request (HARQ) ACK/NACK (Acknowledge/Not Acknowledge) feedback, Channel State Information (CSI) report, a Precoding Matrix Indicator (PMI), Rank Indicator (RI), or beam related information. Example 15 includes the apparatus of any of examples 1-14 or any other example discussed herein, wherein the CSI report is to comprise a Channel Quality Indicator (CQI).

Example 16 includes one or more computer-readable media having instructions stored thereon that, if executed by an apparatus of a user equipment (UE), result in: determining an Uplink Control Information (UCI) payload size based at least in part on configuration information and Downlink Control Information (DCI); determining a Fifth Generation (5G) Physical Uplink Control Channel (xPUCCH) format based at least in part on the determined UCI payload size; and encoding xPUCCH data in accordance with the determined xPUCCH format. Example 17 includes the one or more computer-readable media of example 16 or any other example discussed herein, wherein the instructions, if executed, result in configuration of one or more xPUCCH resource values for each xPUCCH format by higher layers via RRC signaling, wherein an xPUCCH resource allocation field in the DCI is to indicate one of the one or more xPUCCH resource values. Example 18 includes the one or more computer-readable media of any of examples 16-17 or any other example discussed herein, wherein the instructions, if executed, result in encoding of 5G Physical Uplink Shared Channel (xPUSCH) data and the xPUCCH data in a same subframe in response to a determination that xPUSCH and xPUCCH are scheduled in the same subframe for one UE. Example 19 includes the one or more computer-readable media of any of examples 16-18 or any other example discussed herein, wherein the instructions, if executed, result in dropping of xPUCCH and encoding of xPUSCH data for a scheduled subframe in response to a determination that xPUSCH and xPUCCH are scheduled in a same subframe for one UE. Example 20 includes the one or more computer-readable media of any of examples 16-19 or any other example discussed herein, wherein the instructions, if executed, result in configuration of a parameter by higher layers, wherein a state of the parameter is to indicate whether the baseband processing circuitry is to encode both xPUSCH data and the xPUCCH data in a same subframe for one UE. Example 21 includes the one or more computer-readable media of any of examples 16-20 or any other example discussed herein, wherein the instructions, if executed, result in configuration of the parameter via one or more of: a 5G Master Information Block (xMIB), a 5G System Information Block (xSIB), and RRC signaling.

Example 22 includes an apparatus of an enhanced NodeB (eNB) capable to allow for physical uplink control channel procedures, the apparatus of the eNB comprising baseband circuitry, including one or more processors, to: determine an xPUCCH format based at least in part on an Uplink Control Information (UCI) payload size; and decode Fifth Generation (5G) Physical Uplink Control Channel (xPUCCH) data in accordance with the xPUCCH format. Example 23 includes the apparatus of example 22 or any other example discussed herein, wherein the one or more processors of the baseband circuitry is to schedule xPUSCH and xPUCCH for a same UE in different subframes. Example 24 includes the apparatus of example 22 or any other example discussed herein, wherein the one or more processors of the baseband circuitry is to schedule xPUSCH and xPUCCH for a same UE in a same subframe. Example 25 includes the apparatus of any one of examples 22-24 or any other example discussed herein, wherein the one or more processors of the baseband circuitry is to trigger a UE to report HARQ ACK/NACK for one or more HARQ processes. Example 26 includes the apparatus of any one of examples 22-25 or any other example discussed herein, wherein the one or more processors of the baseband circuitry is to trigger a UE to report with CSI feedback. Example 27 includes the apparatus of any one of examples 22-26 or any other example discussed herein, wherein the CSI feedback is to comprise one or more CQI report.

Example 28 includes one or more computer-readable media having instructions stored thereon that, if executed by an apparatus of an eNB, result in: determining an xPUCCH format based at least in part on an Uplink Control Information (UCI) payload size; and decoding Fifth Generation (5G) Physical Uplink Control Channel (xPUCCH) data in in accordance with the xPUCCH format. Example 29 includes the one or more computer-readable media of example 28 or any other example discussed herein, wherein the instructions, if executed, result in scheduling of xPUSCH and xPUCCH for a same UE in different subframes. Example 30 includes the one or more computer-readable media of example 28 or any other example discussed herein, wherein the instructions, if executed, result in scheduling of xPUSCH and xPUCCH for a same UE in a same subframe.

Example 31 includes a system comprising: memory to store information corresponding to a cellular communication; and an apparatus of a User Equipment (UE) capable to allow for physical uplink control channel procedures, the apparatus of the UE comprising baseband circuitry, including one or more processors, to: determine an Uplink Control Information (UCI) payload size based at least in part on configuration information and Downlink Control Information (DCI); determine a Fifth Generation (5G) Physical Uplink Control Channel (xPUCCH) format based at least in part on the determined UCI payload size; and encode xPUCCH data in accordance with the determined xPUCCH format. Example 32 includes the system of example 31 or any other example discussed herein, wherein the one or more processors of the baseband circuitry is to generate the xPUCCH format for an allocated resource, wherein the allocated resource is to be indicated in the DCI. Example 33 includes the system of any of examples 31-32 or any other example discussed herein, wherein the configuration information is to comprise information to be configured via Radio Resource Control (RRC) signaling.

Example 34 includes a system comprising: memory to store information corresponding to a cellular communication; and an apparatus of an enhanced NodeB (eNB) capable to allow for physical uplink control channel procedures, the apparatus of the eNB comprising baseband circuitry, including one or more processors, to: determine an xPUCCH format based at least in part on an Uplink Control Information (UCI) payload size; and decode Fifth Generation (5G) Physical Uplink Control Channel (xPUCCH) data in accordance with the xPUCCH format. Example 35 includes the system of example 34 or any other example discussed herein, wherein the one or more processors of the baseband circuitry is to schedule xPUSCH and xPUCCH for a same UE in different subframes. Example 36 includes the system of example 34 or any other example discussed herein, wherein the one or more processors of the baseband circuitry is to schedule xPUSCH and xPUCCH for a same UE in a same subframe.

Example 37 includes an apparatus comprising means to perform a method as set forth in any preceding example. Example 38 comprises machine-readable storage including machine-readable instructions, when executed, to implement a method or realize an apparatus as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Further, in the description and/or claims, the terms "coupled" and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

Additionally, the terms "on," "overlying," and "over" may be used in the description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of a User Equipment (UE) capable to allow for physical uplink control channel procedures, the apparatus of the UE comprising baseband circuitry, including one or more processors, to:
   receive configuration information via Radio Resource Control (RRC) signaling;
   determine an Uplink Control Information (UCI) payload size based at least in part on configuration information and Downlink Control Information (DCI);
   determine a Fifth Generation (5G) Physical Uplink Control Channel (xPUCCH) format based at least in part on the determined UCI payload size;
   generate the xPUCCH format for an allocated resource, wherein the allocated resource is indicated in the DCI; and
   encode xPUCCH data in accordance with the determined xPUCCH format.

2. The apparatus of claim 1, wherein the DCI is to comprise scheduling information.

3. The apparatus of claim 1, wherein one or more xPUCCH resource values are to be configured for each xPUCCH format by higher layers via RRC signaling, wherein an xPUCCH resource allocation field in the DCI is to indicate one of the one or more xPUCCH resource values.

4. The apparatus of claim 1, wherein the one or more processors of the baseband circuitry is to determine an xPUCCH resource from a resource allocation index in the DCI based at least in part on the determined xPUCCH format.

5. The apparatus of claim 1, wherein one or more xPUCCH resource values are to be configured for all xPUCCH formats by higher layers via RRC signaling, wherein an xPUCCH resource allocation field in the DCI is to indicate one of the one or more xPUCCH resource values.

6. The apparatus of claim 1, wherein the one or more processors of the baseband circuitry is to encode 5G Physical Uplink Shared Channel (xPUSCH) data and the xPUCCH data in a same subframe in response to a determination that xPUSCH and xPUCCH are scheduled in the same subframe for one UE.

7. The apparatus of claim 1, wherein the one or more processors of the baseband circuitry is to drop xPUCCH and is to only encode xPUSCH data for a scheduled subframe in response to a determination that xPUSCH and xPUCCH are scheduled in a same subframe for one UE.

8. The apparatus of claim 1, wherein a parameter is to be configured by higher layers, wherein a state of the parameter is to indicate whether the baseband processing circuitry is to encode both xPUSCH data and the xPUCCH data in a same subframe for one UE.

9. The apparatus of claim 8, wherein the parameter is to be configurable via one or more of: a 5G Master Information Block (xMIB), a 5G System Information Block (xSIB), and RRC signaling.

10. The apparatus of claim 1, wherein the one or more processors of the baseband circuitry shall receive xPUSCH and xPUCCH in the different subframes.

11. The apparatus of claim 1, further comprising transmission circuitry is to transmit data over the xPUCCH based on the determined xPUCCH format.

12. The apparatus of claim 1, wherein the UCI is to comprise one or more: a Scheduling Request (SR), a Hybrid Automatic Repeat Request (HARD) ACK/NACK (Acknowledge/Not Acknowledge) feedback, Channel State Information (CSI) report, a Pre-coding Matrix Indicator (PMI), Rank Indicator (RI), or beam related information.

13. The apparatus of claim 1, wherein the CSI report 1s to comprise a Channel Quality Indicator (CQI).

14. One or more non-transitory computer-readable media having instructions stored thereon that, if executed by an apparatus of a user equipment (UE), result in:
receiving configuration information via Radio Resource Control (RRC) signaling;
determining an Uplink Control Information (UCI) payload size based at least in part on configuration information and Downlink Control Information (DCI);
determining a Fifth Generation (5G) Physical Uplink Control Channel (xPUCCH) format based at least in part on the determined UCI payload size;
generate the xPUCCH format for an allocated resources, wherein the allocated resource is indicated in the DCI; and
encoding xPUCCH data in accordance with the determined xPUCCH format.

15. The one or more non-transitory computer-readable media of claim 14, wherein an xPUCCH resource allocation field in the DCI is to indicate one of the one or more xPUCCH resource values.

16. The one or more non-transitory computer-readable media of claim 14, wherein the instructions, if executed, result in encoding of 5G Physical Uplink Shared Channel (xPUSCH) data and the xPUCCH data in a same subframe in response to a determination that xPUSCH and xPUCCH are scheduled in the same subframe for one UE.

17. The one or more non-transitory computer-readable media of claim 14, wherein the instructions, if executed, result in dropping of xPUCCH and encoding of xPUSCH data for a scheduled subframe in response to a determination that xPUSCH and xPUCCH are scheduled in a same subframe for one UE.

18. The one or more non-transitory computer-readable media of claim 14, wherein the instructions, if executed, result in configuration of a parameter by higher layers, wherein a state of the parameter is to indicate whether the baseband processing circuitry is to encode both xPUSCH data and the xPUCCH data in a same subframe for one UE.

19. The one or more non-transitory computer-readable media of claim 14, wherein the instructions, if executed, result in configuration of the parameter via one or more of: a 5G Master Information Block (xMIB), a 5G System Information Block (xSIB), and RRC signaling.

* * * * *